United States Patent [19]
Kikinis

[11] Patent Number: 5,815,681
[45] Date of Patent: Sep. 29, 1998

[54] INTEGRATED NETWORK SWITCHING HUB AND BUS STRUCTURE

[75] Inventor: Dan Kikinis, Saratoga, Calif.

[73] Assignee: Elonex PLC Ltd., United Kingdom

[21] Appl. No.: 651,118

[22] Filed: May 21, 1996

[51] Int. Cl.⁶ .................................................. G06F 13/00
[52] U.S. Cl. ........................ 395/311; 395/293; 395/200.8
[58] Field of Search ..................................... 395/311, 309, 395/310, 200.02, 200.2, 293, 200.8, 200.68, 200.53, 200.55

[56] References Cited

U.S. PATENT DOCUMENTS 5,546,385  8/1996  Caspi et al. .............................. 370/412

*Primary Examiner*—Glenn A. Auve
*Attorney, Agent, or Firm*—Donald R. Boys

[57] ABSTRACT

A network switching hub is implemented on an IC chip, and has a bus connected to external ports through sets of que switch transistors, source to drain for data switched onto the bus, the queue switch transistors gated simultaneously by control lines from an on-board arbitrator controller following a preprogrammed arbitration scheme. Data is switched off the bus and hub by port adapter controllers connected to read amplifier receivers connected directly to the on-chip bus, the port adapter controllers enabled by the arbitrator controller following the same preprogrammed arbitration scheme. Ports may be serial or parallel, and may be adapted to special purposes, such as PCI and hub to hub connection for expansion.

7 Claims, 3 Drawing Sheets

*Fig. 1* Switching Hub (Prior Art)

INTEGRATED NETWORK SWITCHING HUB AND BUS STRUCTURE

FIELD OF INVENTION

This invention relates generally to computer networks. In particular it pertains to a relatively low cost network switching hub and bus structure integrated into an integrated circuit chip, which improves network performance by increasing bandwidth and reducing collisions.

BACKGROUND OF THE INVENTION

Personal computers (PCs) have permeated nearly all levels of society and business, creating a need to link individual PCs into networks to more efficiently utilize and share resources. Computer networks are becoming increasingly popular in low-cost, performance-oriented computing environments.

One very popular type of network used to link PCs or workstations is called a local area network (LAN). LANs and other types of networks permit the sharing of resources such as software, printers, modems, and other peripherals among PC workstations operating as nodes on the network.

FIG. 1 illustrates a simple and conventional LAN, generally designated by the reference numeral 100. Network 100 comprises a plurality of PC workstations 112a through 112e, each connected by a communication link 113a through 113e respectively to an associated hub 114. Communication links in such networks are typically two-conductor cables, wherein a potential across the two conductors is varied in a manner representing sequential binary data. Such a link is termed a serial link.

Hubs, such as hub 114, in networks are used to connect multiple workstations for routing through a single link to a server. In FIG. 1, PC workstations 112a through 112e are all connected to server 116 through link 115. Hubs typically have a limited number of input ports, so the number of workstations that can be connected is limited as well. Typically the input ports are arranged in groups of 8, 16, 32, 64 and so forth. Further network capacity can be added by connecting multiple hubs, such as hub 118 (shown in dashed lines) to the one file server, and the additional hubs may then be connected to other multiple workstations (not shown). Other network variations include addition of multiple file servers connected in different arrangements to multiple hubs.

File server 116 in this example, and generally in the art, comprises a set of sheared high-capacity mass storage devices, such as hard disks. Such file servers are often special PCs that have higher performance capability and more and larger capacity hard disks than do individual workstations 112a through 112e. The shared disk space on such file servers typically stores software applications which spreads the cost of the hard disk over more than one user, thereby permitting more efficient use of resources.

File server 116 in this example may also contain routers (not shown) for communication and connection to different network protocols such as Ethernet™, Asynchronous Transfer Mode (ATM), and Fiber Distributed Data Interface (FDDI), among others. The output of file server 116 is coupled to shared peripherals such as a network modem 118, a laser printer 120, and other peripherals represented by element number 122. All workstations 112a through 112e on the network share access to the peripherals connected to server 116.

It will apparent to those with skill in the art that the example of FIG. 1 is but one of many network arrangements known in the art.

There are some limitations of a conventional LAN 100 as described above. For example, communication over link 115 is shared by all of the workstations, and if many workstations are attempting to communicate at once, bandwidth may be a problem, slowing communication. By way of example, coaxial lines used in many networks have a maximum data transfer rate of 10 megabytes per second (Mb/s). The maximum data transfer rate, which is related to bandwidth, ultimately determines the maximum number of workstations that can be adequately handled by the network. Overloading a network can result in lost connections, communication delays, slow system response, timeouts, and slow file transfer times. All of these situations decreases the efficiency of the network, and become very annoying to network users.

Another limitation of conventional LANs such as LAN 100, is that communication collisions may occur between multiple workstations requesting access to the network. In commonly used network protocols such as Ethernet™, one way that collisions are handled is by processing one request at-a-time while buffering other requests in a first-in-first-out (FIFO) buffer. Since access is granted one-workstation-at-a time, other stations are required to wait, thereby decreasing efficiency. Networks with heavy traffic tend to have many collisions which may drop efficiency to unacceptable levels.

The problems of inefficient communication are exacerbated by addition of more workstations to the network and increased use of bandwidth-hungry applications such as color publishing and document imaging. So networks that had adequate bandwidth when installed may be outdated simply by software development.

Another way to add bandwidth is by increasing the number of switching hubs. This solution often results in segmenting a single large network into multiple smaller networks, which decreases the amount of traffic that travels over any given communication link and thereby increases the bandwidth available to each individual user. Statistics and traffic patterns can be further analyzed for adjustments for optimal network performance.

Another disadvantage of conventional networks is the relatively high cost of multi-port hubs. By way of example, a 32 or even 16 port hub for some networks can cost in the range of about 32K to 100K dollars, a substantial investment for any user. Also conventional hubs are typically separate units in an enclosure with a dedicated power supply and controlling electronics, adding to clutter and adding to cost.

What is needed is a switchable hub that is relatively low cost, compact, and increases network performance by increasing bandwidth and reducing collisions. As will be described hereinafter, the present invention provides a method and apparatus to meet these objectives.

SUMMARY OF THE INVENTION

In a preferred embodiment an integrated circuit (IC) switching hub is provided, comprising a parallel bus of n bus lines implemented as traces on the IC; a first data port adapter controller connected by n first port lines through a first output buffer to the bus, each first port line connected to a bus line source-to-drain through one of a set of first queue switch transistors, and connected to a first data port providing a first external data link for the switching hub; a first read amplifier connected by n first receiver lines one each directly to each one of the n bus lines, and by a first data link to the first port adapter controller; a second data port adapter controller connected by n second port lines through a second output buffer to the bus, each second port line connected to a bus line source-to-drain through one of a set of second queue switch transistors, and connected to a second data port providing a second external data link for the switching hub; a second read amplifier connected by n second receiver lines one each directly to each one of the n bus lines and by a second data link to the second port adapter controller; and an arbitrator controller connected by a first control line to the gates of the first set of queue switch transistors, by a second control line to the gates of the second set of queue switch transistors, by a third control line to the first port adapter controller, and by a fourth control line to the second port adapter controller. The arbitrator controller is adapted to switch data from the first and second port adapter controllers onto the bus through the first and second output buffers and the first and second sets of queue switch transistors by switching the gates of the transistors via the first and second control lines respectively, and adapted to transfer data from the bus to the first and second external data links via the first and second read amplifiers through the first and second port adapter controllers by enabling the respective port adapter controllers via the third and fourth control lines respectively, according to a preprogrammed arbitration scheme.

In some embodiments the first and second port adapter controllers share a single read amplifier, the read amplifier being connected to both port adapter controllers via a single data link. There may be many more ports and port adapters as well, either sharing receivers or not. Ports may be of any convenient nature, such a serial ports configured for network communication according to a standard protocol, such as Ethernet™. Ports also may be of another sort, such as a PCI parallel port adapted for communication with a PCI bus, or an expansion port adapted for connection to a similar switching hub.

The IC switching hub in embodiments of the invention provides an ability to switch multiple packets without queuing and provides also greatly expanded band width for switching hubs, whereby, in some embodiments, cross traffic may be allowed without contention, depending on source and destination. The hub of the invention furthermore, is much more compact than prior art hubs, and by far less expensive than prior art hubs.

BRIEF DESCRIPTION OF THE DRAWINGS

The invention, together with further objects and advantages thereof, may best be understood by reference to the following description taken in conjunction with the accompanying drawings in which.

DETAILED DESCRIPTION OF THE PREFERRED EMBODIMENTS

Figure 2:
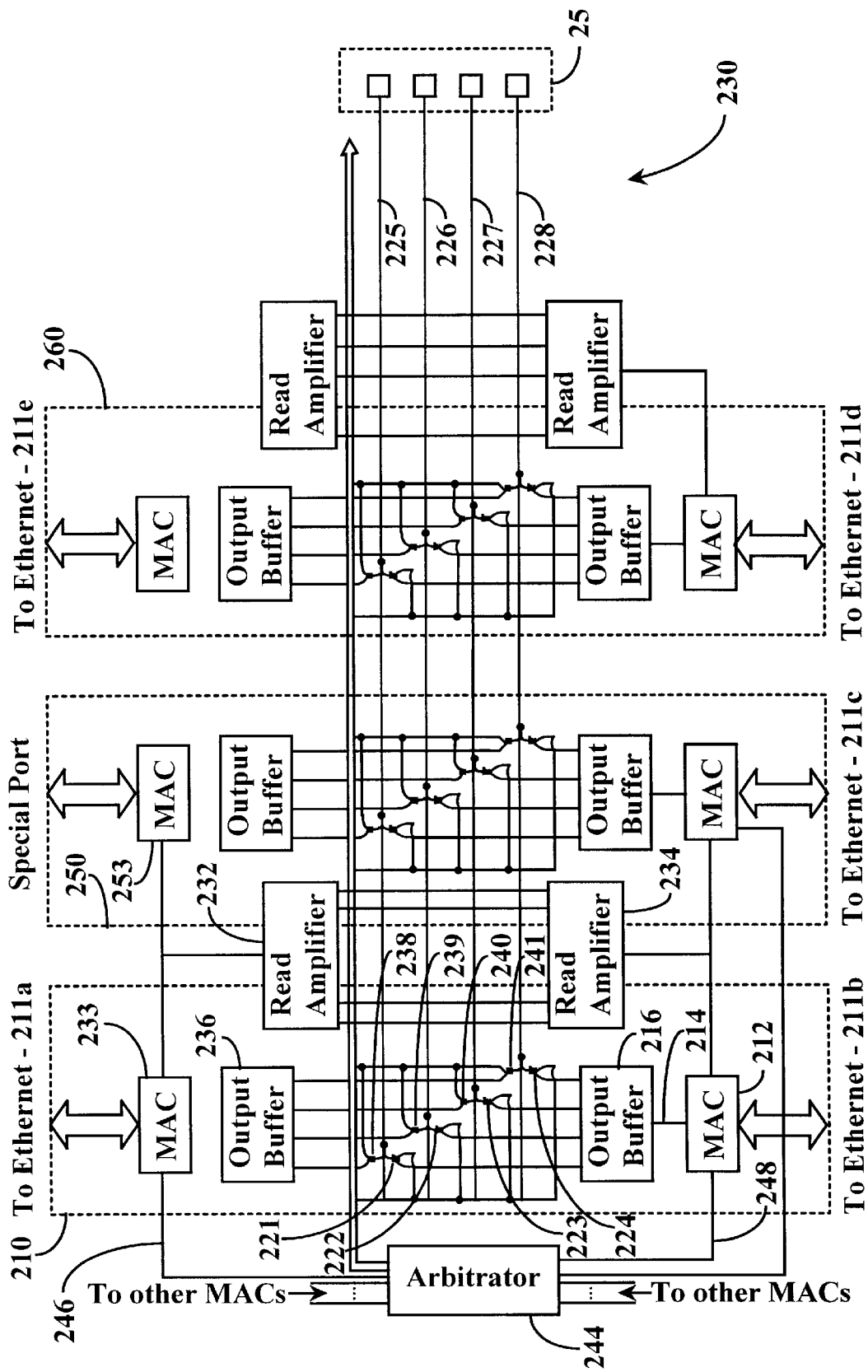
FIG. 2 is diagrammatical plan view of an integrated network switching hub and bus structure according to an embodiment of the present invention.

In accordance with the above stated goals and objectives, a network switching hub bus structure integrated together into a single IC chip is herein described. Refer now to FIG. 2, which is a diagrammatical plan view of an integrated switching hub and bus structure chip according to a preferred embodiment of the present invention. For purposes of illustration, a four conductor bus is shown including components and connections made in accordance to the invention.

It should be understood that the described embodiment can be and is, in other embodiments, extended to a more practical 32, 64, 128 (or more) line bus using the basic configuration described herein.

The purpose of the switching hub is to facilitate data transfer between devices connected to the hub. In many embodiments, and for purposes of illustration, the connections are serial ports. Other sorts of ports may be incorporated, however. In the examples to follow, accordingly, provision is made for connection of serial links to the hub bus, and for arbitration of data transfers between the hub bus and the various serial ports. The architecture of the hub according to embodiments of the present invention is quite regular and repetitive. For this reason description of ports and data transfers is related herein to port units of two ports each.

In this example, for simplicity, only three port units 210, 250 and 260 are shown in detail. There may be more units with substantially the same structure, but not shown to keep the diagram as simple as possible. If the bus has a width of sixteen conductors, for example, there could be 16 or even 32 units like units 210, 250, and 260 illustrated.

In this embodiment each port unit has two Medium Adapter Controllers (MACs), two output buffer transmitters, and access to two read amplifier receivers, all interconnected in a manner to be described below. Referring to unit 210 these are MACs 212 and 233, transmitters 216 and 236, and receivers 232 and 234. Receivers 232 and 234 are shared between unit 210 and unit 250 as is described more fully below.

Figure 1:
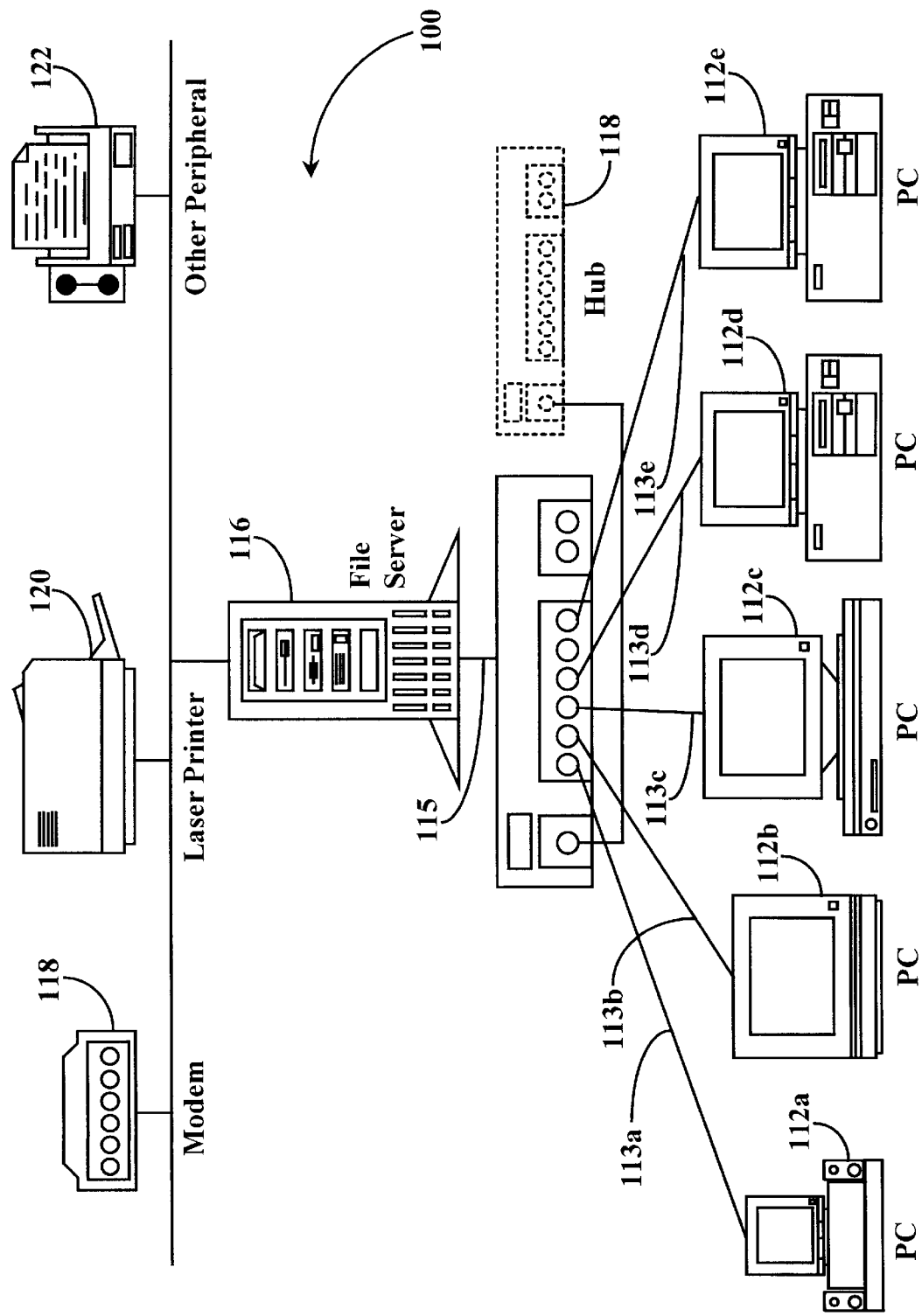
FIG. 1 is a block diagram of a conventional LAN network.

In the embodiment shown, a network link is connected to MAC 212 at port 211b. In this exemplary embodiment, this is link 113b of FIG. 1. A different numerical nomenclature is used in this example simply because, in many networks, there is other hardware not shown between the port and the carrier line. For all practical purposes we may consider here that the lines 113a–113e are connected to the ports 211a211e of the hub of FIG. 2. It will be apparent to those with skill in the art, however, that there is a broad variety of links that may be connected at this point. In the example given, any one of the links of FIG. 1 may be connected at any port of the hub of FIG. 2.

Continuing with the example, MAC 212 attaches to data layers of protocol to conform to the standard being used, for example, American National Standards Institute (ANSI), or Industrial Electrical Electronic Engineers (IEEE) standards. Data is transmitted from MAC 212 through bus 214 to transmitter 216 which mainly buffers the data always onto the four lines 217, 218, 219, and 220, each connecting via a switch 221, 222, 223 and 224 respectively to an associated bus line of bus 230.

Switches 221 through 224 are queue switch transistors. Such transistors are very fast (subnanoseconds) switching metal oxide (MOS) transistors.

Lines 217, 218, 219, and 220 are coupled to the sources of transistors 221, 222, 223, and 224 respectively. The drains of transistors 221, 222, 223, and 224 are coupled to bus lines 225, 226, 227, and 228 respectively, thereby creating a pathway for data from lines 217, 218, 219, and 220 to reach the bus through the transistors.

The gates of transistors 221, 222, 223, and 224 are coupled together as shown in FIG. 2 by a common line 255 to allow simultaneous enablement of the transistors, which allows data from transmitter 216 onto bus 230 with all bits being transferred simultaneously.

Data present on bus 230 is capable of being read by all receivers, such as receivers 232 and 234, since all receivers are connected directly to bus 230 as shown. Data is typically transferred in the form of packets containing at least two parts: (a) routing information, and (b) the data. The routing information tells the MACs with the help of an arbitrator 244 via buses such as buses 248 and 246 and others where the data should go.

Receivers, such as receiver 232, are always enabled to receive data present on the bus. Since each of the receivers of the other modules are coupled directly to bus 230 as well, only a MAC enabled by the arbitrator will receive the data on bus 230 via its receiver.

Data from receiver 232, for example, is in communication with a data register (not shown) which is controlled by MAC 233. MAC 233 is further connected to line drivers and filters not shown. Further, each of the lines of bus 230 is connected to an associated line to an output buffer 236 via individual queue switch transistors 238, 239, 240, and 241. Data from output buffer (transmitter) 236 is transmitted to a data register for output to MAC 233. Queue switch transistors 238, 239, 240, and 241 are controlled by arbitrator 244 simultaneously via a common line 256, and thus the data flow to output buffer 236 can be controlled.

In addition to controlling the queue switches on data bus 230, arbitrator 244 is coupled to enable all receiving functions through the medium adapter controllers. For example, even though read amplifier 232 is always enabled to receive data on the bus, as described above, this data is retrieved by enabling MAC 233 to read the data from receiver 232 to which the MAC is connected.

Arbitrator 244 is of critical importance to functions of the system in embodiments of the invention because of its role in directing the path of the data. Since all of the receivers are connected to bus 230 and are always enabled, data from any receiver can be retrieved by enabling an appropriate connected adpater controller by the arbitrator. It will be apparent to those with skill in the art that only one reciver would be sufficient for the system described, if that receiver were to be appropriately connected to each adapter controller. The sheer size of hubs in practical embodiments, having mant ports and therefore many port adapter controllers, makes connecting all adapter controllers to a single, or even to a few receivers is impractical. The scheme shown and described of sharing a receiver between sets of two ports is examplary and geometrically desirable for construction of such hubs, as is described more fully below.

A communication line 248 from MAC 212 to arbitrator 244 tells the arbitrator that data from a particular unit has been put on the bus. The arbitrator uses this information to select the appropriate receiver to retrieve the data. All MACs at net connections are in communication in this way with arbitrator 244, thereby permitting the arbitrator to determine which receiver should receive the data, according to a predetermined selection scheme. The selection (arbitration) scheme may be changed remotely through input to arbitrator 244, and the particular arbitration scheme is not limiting to the invention.

By way of example, an arbitration scheme of selecting a receiver according to low frequency of use may be changed to select receivers according to high frequency of use. This can be accomplished by toggling an input line to arbitrator 244 to activate internal circuitry to follow a particular selection scheme.

Not all MACs have to be for the same topology and bus speed. For example one of the MACs (253) could support a GIGAlink or similar type of high-band-width link.

It is well known to those with skill in the art that a bus structure formed in an integrated circuit chip must be held at a particular voltage state and should not be left floating. A floating voltage level on the bus causes excessive power dissipation of internal circuitry which may lead to destruction of the device. For this reason, pull-up resistors (or bus holders) 254 are connected to bus 230.

A major feature providing a major advantage for the above-described apparatus and technique over conventional systems is that collisions are avoided since the queue transistors switch substantially faster than the incoming data rate from the Ethernet network. Thus the switching hub results in an immediate improvement in network performance. In contrast, the prior art method of simply routing requests through a FIFO buffer requires queued requests to wait, yielding inefficient performance during times of heavy network activity.

Another major advantage of the present invention is that the layout described above and shown in FIG. 2 may be efficiently incorporated into a single integrated circuit chip. The current method of semiconductor fabrication using multi-layer metalization is exploited in embodiments of the present invention by fabricating portions of the layout on different metal layers in the chip. By way of example, the queue switch transistors, such as transistors 221, 222, 223, 224 and 238, 239, 240, 241 of FIG. 2 are fabricated in the first metalization layer, often referred to as metal-1, and bus structure 230 is fabricated in another metalization layer such as metal-2.

In the layered fabrication technique the queue switch transistors may be conveniently positioned in the substrate to be underneath the bus structure in the metal layers in such a way that each transistor is connected to the appropriate associated bus line by a vertical via. Lines 217, 218, 219, and 220 from transmitter 216, enable lines 246, queue switch enable lines, and communication lines 248 reside on another metal layer in the chip. The metal layers are electrically connected with tungsten contacts through vias etched in the dielectric layer. Connecting multi-metalization layers in semiconductor chips with contacts formed through etched vias in the dielectric is well known to those skilled in the art.

The topological layout of the bus structure and interconnection lines permits convenient integration into one low-cost chip as opposed to requiring separate components as in the prior art.

Figure 3:
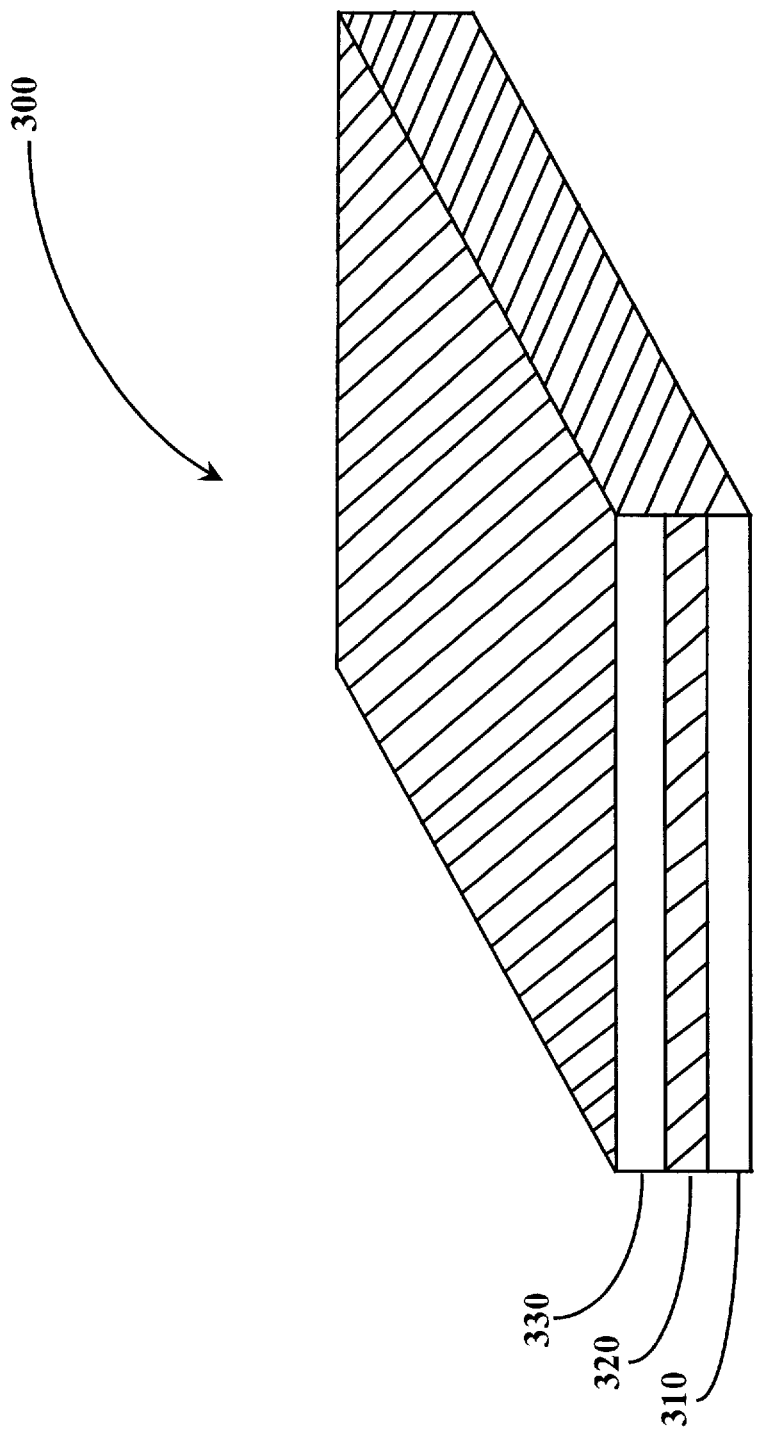
FIG. 3 is a perspective view of an integrated circuit die according to an of the embodiment of the present invention.

FIG. 3 is a perspective illustration of an integrated circuit chip 300 in accordance with an embodiment of the present invention. The interconnection lines that electrically connect the queue switch transistors, arbitrator, MAC, receivers, transmitters, read amplifier etc. are fabricated into a first metalization layer 310 (sometimes referred to as metal-1). A dielectric layer 320 is then overlaid over the metal-1 layer to prevent contact between the metal layers. On top of dielectric layer 320 is a second metalization layer 330 (metal-2) is formed, and the bus structure is fabricated into metal-2. Connections between the substrate and various metal layers are made with contacts as described above. A brief description of a typical multi-metalization fabrication process follows to illustrate a possible fabrication method for the present invention.

The fabrication of a multi-metalization integrated circuit starts with the fabrication of the substrate itself, which is done in a sequential set of processes often referred to in the IC fabrication art as the front end processes. Back end processing involves manufacture of finished functional ICs by further fabrication steps. It is often useful to split fabrication in this way because many customers of a substrate manufacturer use the same substrates to fabricate their own ICs. In the present invention, the front end processes are relatively unimportant for illustrating embodiments of the present invention, whereas the back end processes will be the focus of the impending discussion.

In accordance with one aspect of the invention, the process begins with a contact mask and a contact etch applied over the polysilicon substrate.

An optional step of depositing a glue layer prior to metal deposition is performed to function as a diffusion layer between the metal and the substrate. This is followed by a blanket deposition of a metal-1 layer which is deposited on top of the glue layer. The metal layer may be of any suitable metal used in the industry such as aluminum (Al), aluminum copper (AlCu), or aluminum silicon copper (AlSiCu), and is deposited by a method such as chemical vapor deposition (CVD), which is well known in the industry.

Next, an etching step of the of the metal-1 layer is performed such that interconnection lines are formed in the metal-1 layer that will connect to the queue switch transistors. Etching is then done by first depositing a mask, such as a photoresist layer, which becomes cured and insoluble upon exposure to light and thereby cannot be washed away by solvents. Such masks are known as a negative resists since the areas not covered by the mask are etched away. Next, the metal-1 layer is etched by a plasma process such as sputtering or reactive ion etching (RIE) to form the interconnection lines.

After the metal-1 etch, the photoresist is removed, which can be done by a variety of dry and wet chemical etches. Plasma removal of the photoresist can be performed and is known as plasma ashing. This is done by placing the substrates in a tunnel reactor in the presence of an oxygen plasma which triggers reactions that oxidize the resist. The reaction produces a combination of water, carbon monoxide, and carbon dioxide which are quickly desorbed.

Following the removal of the resist, a dielectric layer is deposited over the metal-1 layer in order to insulate the metal-1 layer from the next metal layer (metal-2). Both SiO2 and borophosphosilicate glass (BPSG) are commonly used for dielectric layers. BPSG for the dielectric layer is preferred since it can be deposited with less stress than undoped films. Other dielectrics such as Si3N4 and polyimide films which can be laid on by spinning may be used.

A via mask is then deposited on the dielectric layer leaving via patterns for exposure to an etchant to form vias (holes) in the dielectric through which interconnection of structure on the metal layers may be accomplished. After formation of the vias in the dielectric, the next metalization layer (metal-2) is deposited and the above steps are repeated until a final metalization layer (as many as metal-3 or metal-4) is reached. The fabrication of the top metalization layer includes metal bond pads for attachment to bonding wires that are attached to the lead frame of an IC package, providing interconnection to the outside world.

It should be understood that the above-described process is a general description of multi-metalization fabrication and that certain steps may be performed in other sequences or steps may be added or eliminated.

The present invention in various embodiments provides a low cost network switching hub (in the hundreds of dollars) in a small integrated circuit chip that can be mounted on an associated circuit board which can be installed in a file server. Another advantage is that the present invention consumes less power, produces less noise, and provides faster performance than prior art hubs.

While only one aspect of the present invention has been described in detail, it should be understood that the present invention may be embodied in other specific forms without departing from the spirit or scope of the invention. For example, there are ways of implementing the invention other than the embodiment disclosed of being installed directly into the file server. The invention may be implemented into a separate unit albeit much smaller and less power-consuming than that of the prior art. Other aspects such as extending the embodiment described to incorporate larger numbers of bus lines is included in the scope of the invention. Therefore, the present examples are to be considered as illustrative and not restrictive, and the invention is not to be limited to the details given herein, but may be modified within the scope of the appended claims.

What is claimed is:

1. An integrated circuit (IC) switching hub, comprising:
    a parallel bus of n bus lines implemented as traces on the IC;
    a first data port adapter controller connected by n first port lines through a first output buffer to the bus, each first port line connected to a bus line source-to-drain through one of a set of first queue switch transistors, and connected to a first data port providing a first external data link for the switching hub;
    a first read amplifier connected by n first receiver lines one each directly to each one of the n bus lines, and by a first data link to the first port adapter controller;
    a second data port adapter controller connected by n second port lines through a second output buffer to the bus, each second port line connected to a bus line source-to-drain through one of a set of second queue switch transistors, and connected to a second data port providing a second external data link for the switching hub;
    a second read amplifier connected by n second receiver lines one each directly to each one of the n bus lines and by a second data link to the second port adapter controller; and
    an arbitrator controller connected by a first control line to the gates of the first set of queue switch transistors, by a second control line to the gates of the second set of queue switch transistors, by a third control line to the first port adapter controller, and by a fourth control line to the second port adapter controller;
    wherein the arbitrator controller is adapted to switch data from the first and second port adapter controllers onto the bus through the first and second output buffers and the first and second sets of queue switch transistors by switching the gates of the transistors via the first and second control lines respectively, and adapted to transfer data from the bus to the first and second external data links via the first and second read amplifiers through the first and second port adapter controllers by enabling the respective port adapter controllers via the third and fourth control lines respectively, according to a preprogrammed arbitration scheme.

2. An IC switching hub as in claim 1 wherein the ports are serial ports adapted for network communication.

3. An IC switching hub as in claim 1 further comprising plural pairs of external data ports wherein one of the external data ports is adapted for connecting the IC switching hub to a second IC switching hub.

4. An IC switching hub as in claim 1 wherein the queue switch transistors are implemented in one layer on the chip, and connections are implemented in another layer.

5. An integrated circuit (IC) switching hub, comprising:

a parallel bus of n bus lines implemented as traces on the IC;

a first data port adapter controller connected by n first port lines through a first output buffer to the bus, each first port line connected to a bus line source-to-drain through one of a set of first queue switch transistors, and connected to a first data port providing a first external data link for the switching hub;

a second data port adapter controller connected by n second port lines through a second output buffer to the bus, each second port line connected to a bus line source-to-drain through one of a set of second queue switch transistors, and connected to a second data port providing a second external data link for the switching hub;

a read amplifier connected by n receiver lines one each directly to each one of the n bus lines and by a data link to the first and second port adapter controllers; and an arbitrator controller connected by a first control line to the gates of the first set of queue switch transistors, by a second control line to the gates of the second set of queue switch transistors, by a third control line to the first port adapter controller, and by a fourth control line to the second port adapter controller;

wherein the arbitrator controller is adapted to switch data from the first and second port adapter controllers onto the bus through the first and second output buffers and the first and second sets of queue switch transistors by switching the gates of the transistors via the first and second control lines respectively, and adapted to transfer data from the bus to the first and second external data links via the read amplifier through the first and second port adapter controllers by enabling the respective port adapter controllers via the third and fourth control lines respectively, according to a preprogrammed arbitration scheme.

6. An IC switching hub as in claim 5 further comprising plural additional sets of ports in pairs, each pair of ports sharing an additional read amplifier connected to both port adapter controllers of each pair.

7. An IC switching hub as in claim 6 wherein one port is a PCI parallel port adapted for communication with a PCI bus.

* * * * *